United States Patent Office 2,808,632
Patented Oct. 8, 1957

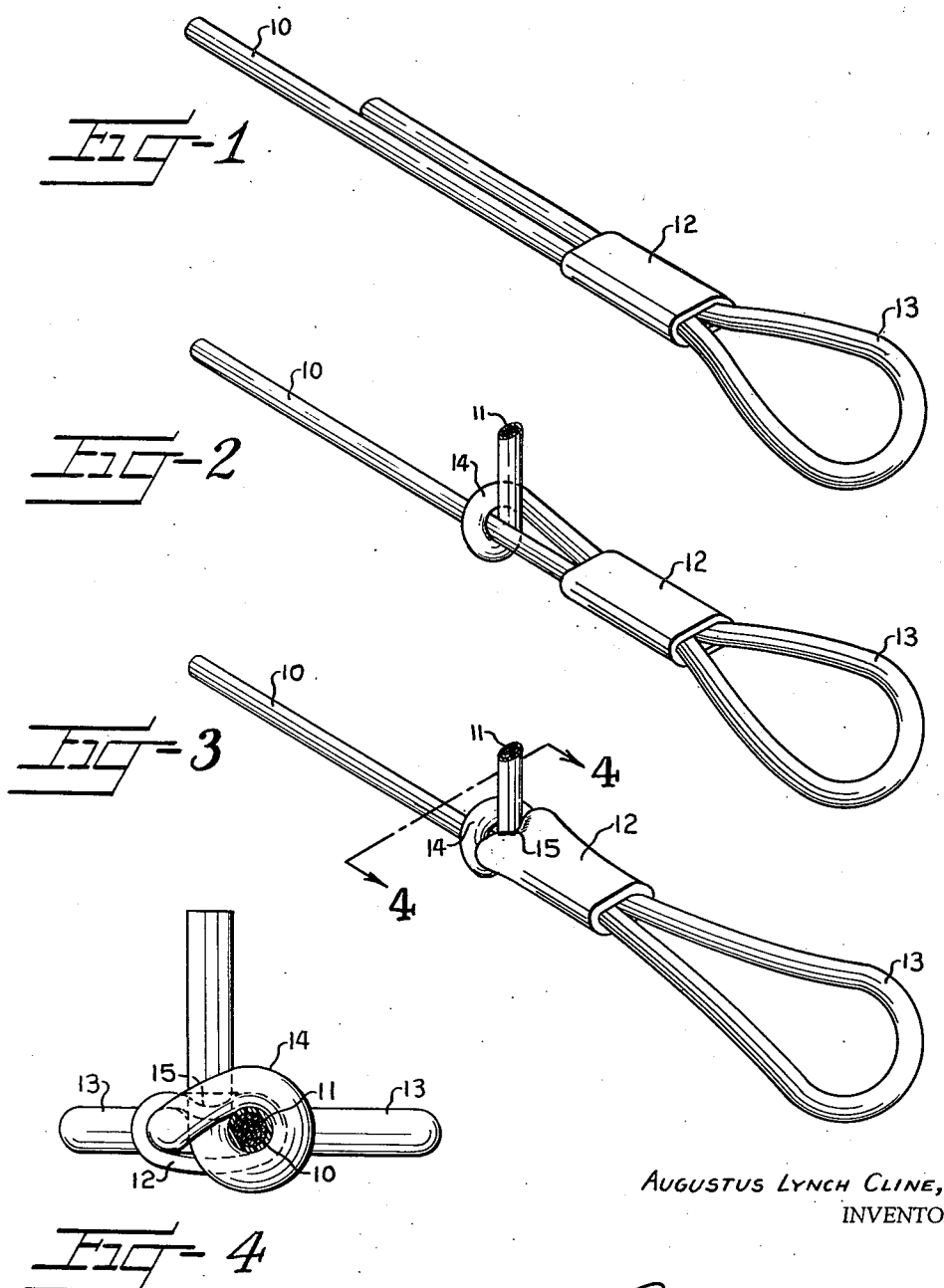

2,808,632

COMBINATION KNOT AND RETAINING MEANS THEREFOR

Augustus Lynch Cline, Hickory, N. C., assignor to Shuford Mills, Inc., Hickory, N. C., a corporation of North Carolina Application April 29, 1952, Serial No. 284,998

1 Claim. (Cl. 24—129)

This invention relates to a combination knot adapted to be formed in one end of a line and to retaining means therefor. More especially the invention relates to means for forming, holding, or securing a knot or a loop in a plastic clothes-line or the like to prevent the knot from becoming untied or from slipping out of place.

It is an object of this invention to provide a knot and a knot or loop retaining member for use with clothes-lines and the like and particularly with a plastic clothes-line wherein the material has a fairly slick outer surface so that a conventional knot or loop formed therein would ordinarily slip out of position. By means of this invention, a knot retaining member is positioned about the clothes-line in engagement with a single-loop knot to hold said knot and to prevent the same from slipping so that the loop or knot formed in the clothes-line or the like will maintain its desired position.

Heretofore in using clothes-lines or the like of plastic or other relatively slick material, when one end of the line was formed into a loop or a knot for attaching the same to a support, the plastic material would slide to cause the knot to untie or slip upon any weight or pressure being applied to the line. The object of this invention is to provide a knot and a resilient tubular member through which the line may be passed to form a loop so that the line may then be knotted and the resilient member slidably moved to a position engaging the knot, whereby the resilient member will prevent the knot from slipping to thus maintain the loop in the end of the clothes-line or the like. By means of this resilient tubular member, a knot may be formed by making a single loop of the line and the tubular member will hold the same in place.

Some of the objects of the invention having been stated, other objects will appear as the description proceeds, when taken in connection with the accompanying drawings, in which:

Figure 1 is an isometric view of one end of a plastic-type clothes-line doubled to form a loop and extending through the improved retaining member;

Figure 2 is an isometric view of the clothes-line and retaining member showing the first step in forming the single-loop knot;

Figure 3 is an isometric view of the clothes-line and retaining member showing the retaining member moved into engagement with the knot for holding the same in position to prevent slippage;

Figure 4 is a vertical sectional view taken along the line 4—4 in Figure 3 showing the manner in which the edge of the retaining member adjacent the knot is depressed for additionally securing the knot in position.

Referring more specifically to the drawing, the numeral 10 indicates a clothes-line which is preferably tubular and formed of plastic or other relatively slick material and which may have an inner core of a plurality of threads 11 as shown in Figure 4. To overcome the previously mentioned difficulties, there is provided a knot retaining tubular member 12. The member 12 is preferably made from resilient material such as rubber or plastic and may be formed in long tubes and then cut to the desired lengths.

One end of the clothes-line 10 is passed through the tubular knot retaining member 12 and a terminal loop 13 is formed in the clothes-line and the free or running end of the line is then passed back through the retaining member 12, as illustrated in Figure 1. The interior dimensions of the retaining member 12 are sufficient to receive a double portion of the line 10 and, due to the resilient nature of the member 12, the portions of the line 10 within the tube 12 are frictionally engaged by the member 12.

With the end of the line thus looped through the retaining member 12, the free end of the line may then be looped over the main portion or standing apart of the line 10 and the end thereof passed up through the loop thus formed to form a single-loop knot indicated at 14 in Figure 2. With the knot 14 thus formed, the retaining member 12 may be slid on the line 10 to a point where one edge of the retaining member 12 is in close frictional contact with the knot 14. Due to the resilient nature of the retaining member 12, the leading edge thereof will be depressed, as at 15, by the free end of the line 10 at the knot 14.

Since the retaining member 12 frictionally engages the double strand of clothes-line passing therethrough and frictionally engages the knot 14, this retaining member 12 will stay in position and will serve to hold the knot 14 in position and prevent the same from becoming untied or slipping. Referring to Figure 4, it will clearly be observed how two passes of the line 10 pass through the retaining member and how the depression 15 is formed therein due to the engagement of the retaining member with the knot 14.

When pressure is applied to the loop 13 or the main portion of the line 10, as by pulling, the knot 14 will be urged against the retaining member 12 to cause the depression 15 to be enlarged and to wedge against the free end of the line 10 at the knot to prevent slippage thereof. Thus, the greater the pull or load on the line, the tighter the knot 14 will be held by the retaining member 12.

In the drawing and specification there has been set forth a preferred embodiment of the invention and, although specific terms are employed, they are used in a generic and descriptive sense only and not for purposes of limitation, the scope of the invention being defined in the claim.

I claim:

In combination, a sleeve and a plastic coated line, said line having a standing part and a running end both snugly threaded through the sleeve to define a loop, the running end substantially encircling the standing part remote from the loop forming a wrapped portion and having a terminal end threaded between the wrapped portion and the sleeve, said sleeve being formed of thin deformable material and forced against the terminal end, the end of the sleeve engaging and partially encircling the terminal end of the line having a depressed portion therein whereby the sleeve is increasingly wedged against the terminal end as tension is applied to the line.

References Cited in the file of this patent

UNITED STATES PATENTS

| | | |
|---|---|---|
| 825,753 | Paul | July 10, 1906 |
| 1,360,189 | Cushing | Nov. 23, 1920 |
| 1,481,903 | Hart | Jan. 29, 1924 |
| 1,907,629 | Walty | May 9, 1933 |
| 2,060,499 | Heidrich | Nov. 10, 1936 |

FOREIGN PATENTS

| | | |
|---|---|---|
| 122,181 | Austria | Apr. 10, 1931 |